United States Patent
Ivanov et al.

(10) Patent No.: US 8,280,839 B2
(45) Date of Patent: Oct. 2, 2012

(54) NEAREST NEIGHBOR METHODS FOR NON-EUCLIDEAN MANIFOLDS

(75) Inventors: Yuri A. Ivanov, Arlington, MA (US); Rizwan Choudhry, Baltimore, MD (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 438 days.

(21) Appl. No.: 12/712,791

(22) Filed: Feb. 25, 2010

(65) Prior Publication Data

US 2011/0208688 A1 Aug. 25, 2011

(51) Int. Cl.
*G06F 17/00* (2006.01)
(52) U.S. Cl. .......................................... 706/54
(58) Field of Classification Search .................. None
See application file for complete search history.

(56) References Cited

U.S. PATENT DOCUMENTS

| | | | |
|---|---|---|---|
| 7,379,602 B2 * | 5/2008 | Yang ............................. | 382/225 |
| 2011/0087468 A1 * | 4/2011 | Lewis et al. ...................... | 703/2 |
| 2011/0274217 A1 * | 11/2011 | Drake et al. .................. | 375/340 |

* cited by examiner

*Primary Examiner* — Jeffrey A Gaffin
*Assistant Examiner* — Paulinho E Smith
(74) *Attorney, Agent, or Firm* — Dirk Brinkman; Gene Vinokur

(57) ABSTRACT

Embodiments of the invention disclose a system and a method for determining a nearest neighbor to an input data point on a non-Euclidean manifold. The data points on the non-Euclidean manifold are clustered, projected into Euclidean sub-space nearest to the cluster and mapped from the Euclidean sub-space into a Hamming space such that neighboring data points of the Hamming space corresponds to neighboring data points on the non-Euclidean manifold. The method maps the input data point to the Hamming space corresponding to a particular Euclidean sub-space, wherein the particular Euclidean sub-space is the nearest to the input data point, and selects a data point corresponding to a nearest data point to the input data point in the Hamming space as the nearest neighbor for the input data point on the non-Euclidean manifold.

20 Claims, 5 Drawing Sheets

100

NEAREST NEIGHBOR METHODS FOR NON-EUCLIDEAN MANIFOLDS

FIELD OF THE INVENTION

The present invention relates generally to determining a nearest neighbor of a data point on a manifold, and more particularly to determining a nearest neighbor for a data point on a non-Euclidean manifold.

BACKGROUND OF THE INVENTION

Human action analysis using computer vision techniques enables applications such as automatic surveillance, behavior analysis, and elderly care. However, the automatic analysis of human motion in videos is currently limited to relatively simple classes of predefined motions, small data sets and simple human actions, such as a single person performing a single primitive action, in a video that is relatively short in length.

In contrast, in a real-life surveillance scenario, video data are often continuously recorded and saved for later analysis. In a typical case, a search for a specific instance of an activity in the video data can result in days of watching video to find images of interest. Performing semantic queries such as "find all instances where a person is walking from left to right", or "find instances where a person starts walking and then starts running" remains very difficult.

Approximate Nearest Neighbor

Approximate nearest neighbor (ANN) methods, such as variants of locality sensitive hashing (LSH), semantic hashing, and spectral hashing, are computationally efficient for finding objects similar to a query object in large datasets. Those methods have been used to quickly search images in web-scale datasets that can contain millions of images. Unfortunately, the key assumption in those methods is that data points in the dataset are in a Euclidean space and can only be compared using Euclidean distances.

This assumption is not always valid and poses a challenge to several computer vision applications where data commonly are defined on complex non-Euclidean manifolds. In particular, dynamic data, such as human activities, are usually represented as dynamical systems, which lie on non-Euclidean manifolds. Accordingly, the search for the nearest neighbor of the data point has to consider the geometry of the manifold.

Spectral Hashing

As shown in FIG. 2, a spectral hashing (SH) method is an example of hashing methods that map data points lying on Euclidean manifold 210 onto Hamming space 220 such that neighboring data points 225 in Hamming space correspond to neighboring data points 215 on the Euclidean manifold.

Accordingly, for the data points, $\{x_i\}_{i=1}^N \in R^d$, the goal of the spectral hashing is to find k-bit binary vectors, $\{y_i\}_{i=1}^N \in \{-1,1\}^k$ such that similar points in, $R^d$ under the similarity measure, $$W_{ij} = \exp\left(-\frac{\|x_i - x_j\|^2}{\varepsilon^2}\right)$$

and map to binary vectors that are close to each other under the Hamming distance weighted by a weighting function W.

If the data points $X_i$ are sampled from a probability distribution p(x), then the SH solves the following optimization problem:

minimize $\int \|y(x_1)-y(x_2)\|^2 W(x_1,x_2)$ $p(x_1)p(x_2)dx_1 dx_2$ s.t. $y(x) \in \{-1,1\}^k$ $\int y(x)p(x)dx=0$ $\int y(x)y(x)^T p(x)dx=I$ \hfill (1)

Relaxing the first constraint gives a solution y for the Equation (1) as the first k eigenfunctions of the weighted Laplace-Beltrami operator on the manifold. If the distribution p is multi-dimensional uniform distribution on the Euclidean space $R^d$ and the weighting function W is defined as above, then there is one closed form solution for these eigenfunctions.

If the distribution p is a Gaussian distribution on the Euclidean space $R^d$, there exists an iterative solution.

The spectral hashing method is summarized into the following steps:
Determining principal components of data using principal component analysis (PCA);
Compute the k smallest single-dimension analytical eigenfunctions of the Laplace-Beltrami operator under the specified weighting function and probability distribution by using a rectangular approximation along every PCA direction; and
Threshold the analytical eigenfunctions computed for each data point at zero, to obtain binary codes.

In theory, any probability distribution on a general manifold and a weighting function can be used to analytically compute the eigenfunctions of the corresponding Laplace-Beltrami operator. However, even for scalar Euclidean data, such computation remains an open and unsolved problem.

In the case of non-Euclidean data that for example represent human activities, such an analysis becomes extremely difficult. The distribution of the data points is usually unknown, and even if a form of the distribution is assumed, a closed-form representation for the distribution on a particular manifold might not exist. Moreover, the weighting function is no longer a simple exponential similarity function as the function is based on geodesic or chord distances on the manifold. Finally, the exact computation of the solution of the minimization problem in Equation (1) for any general weighting function, probability distribution on any arbitrary manifold is extremely difficult.

Kernel Spectral Hashing (KSH) method uses kernel PCA instead of PCA to find the eigenfunctions. The method embeds the data points in a high-dimensional Euclidean space, and finds the value of the eigenfunction at each data point. However, the KSH method computes the kernel of an input data point with all the data points in a training set that used to compute the kernel PCA components. This is as computationally complex as performing exact nearest neighbors by using the kernel as an affinity measure. Even though a well-chosen kernel might give very good results in terms of retrieval accuracy, the KSH method has a computational complexity of O(N), where N is the number of the data points in the training set, which could be in the millions.

Accordingly, it is desired to provide an efficient method for determining the nearest neighbor for the data points lying on a non-Euclidean manifold.

SUMMARY OF THE INVENTION

Embodiments of the invention are based on a realization that approximate nearest-neighbor methods, e.g., a spectral hashing, can not be used directly for data points on a non-Euclidean manifold, and projecting the entire data set into Euclidean space results in large distortions of intrinsic distances.

Therefore, the embodiments of the invention cluster the data points on the non-Euclidean manifold into a set of clusters. For each cluster, a nearest Euclidean sub-space forming a set of Euclidean sub-spaces is determined.

The data points of each cluster are projected into corresponding Euclidean sub-space, such that each cluster is approximated by data points lying on the Euclidean sub-space to produce a set of approximated clusters.

Each of the approximated clusters is mapped into a corresponding Hamming space to produce a set of Hamming clusters, such that neighboring data points on the Hamming cluster corresponds to neighboring data points on the non-Euclidean manifold.

One embodiment of the invention discloses a method for determining a nearest neighbor to an input data point lying on a non-Euclidean manifold from data points lying on the non-Euclidean manifold. The method clusters the data points into a set of clusters; determines, for each cluster, a Euclidean sub-space nearest to the cluster to form a set of Euclidean sub-spaces; projects the data points of each cluster into the Euclidean sub-space nearest to the cluster, such that each cluster is approximated by data points lying on the Euclidean sub-space to produce a set of approximated clusters; maps each of the approximated clusters into a corresponding Hamming space to produce a set of Hamming clusters, such that neighboring data points of the Hamming cluster corresponds to neighboring data points on the non-Euclidean manifold; maps the input data point to the Hamming cluster corresponding to a particular Euclidean sub-space, wherein the particular Euclidean sub-space is nearest to the input data point; and selects the data point corresponding to the nearest data point to the input data point in the Hamming space as the nearest neighbor for the input data point on the non-Euclidean manifold, wherein the steps are performed in a processor.

Another embodiment discloses a method for determining a nearest neighbor to an input data point on a non-Euclidean manifold. The data points on the non-Euclidean manifold are clustered, projected into Euclidean sub-space nearest to the cluster and mapped from the Euclidean sub-space into a Hamming space such that neighboring data points of the Hamming space corresponds to neighboring data points on the non-Euclidean manifold. The method maps the input data point to the Hamming space corresponding to a particular Euclidean sub-space, wherein the particular Euclidean sub-space is the nearest to the input data point, and selects a data point corresponding to a nearest data point to the input data point in the Hamming space as the nearest neighbor for the input data point on the non-Euclidean manifold.

Yet another embodiment discloses a system for determining a nearest neighbor to an input data point lying on a non-Euclidean manifold from data points lying on the non-Euclidean manifold, wherein the data points are clustered and the data points of each cluster are projected into Euclidean sub-space nearest to the cluster and mapped from the Euclidean sub-space into a Hamming space producing a set of Hamming spaces such that neighboring data points of the Hamming space corresponds to neighboring data points on the non-Euclidean manifold. The system comprises a processor configured to map the input data point to the Hamming space corresponding to a particular Euclidean sub-space, wherein the particular Euclidean sub-space is the nearest to the input data point, wherein the mapping is performed by a processor; and means for selecting a data point corresponding to a nearest data point to the input data point in the Hamming space as the nearest neighbor for the input data point on the non-Euclidean manifold.

DETAILED DESCRIPTION OF THE PREFERRED EMBODIMENT

Embodiments of the invention reduce a task of determining a nearest neighbor for an input data point on non-Euclidean manifold to determining which particular Euclidean sub-space from the set of Euclidean sub-spaces is the nearest to the input data point, projecting the input data point into the particular Euclidean sub-space, and mapping the projection onto the corresponding Hamming space. A data point corresponding to the nearest data point to the input data point in the Hamming space is selected as the nearest neighbor for the input data point on the non-Euclidean manifold.

Figure 1:
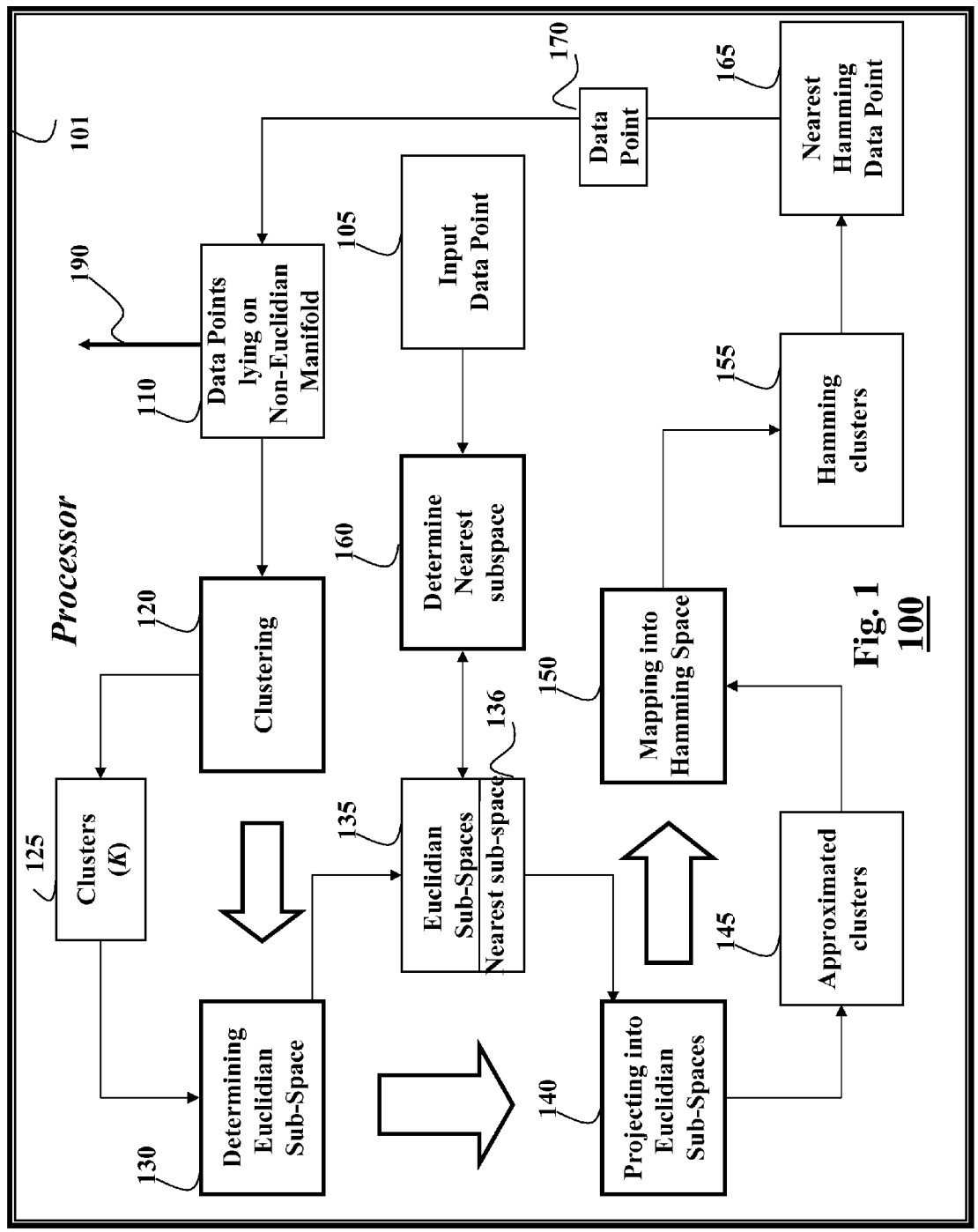
FIG. 1 is a block diagram of a method for determining the nearest neighbor for an input data point lying on non-Euclidean manifold according to embodiments of invention.
Figure 2:
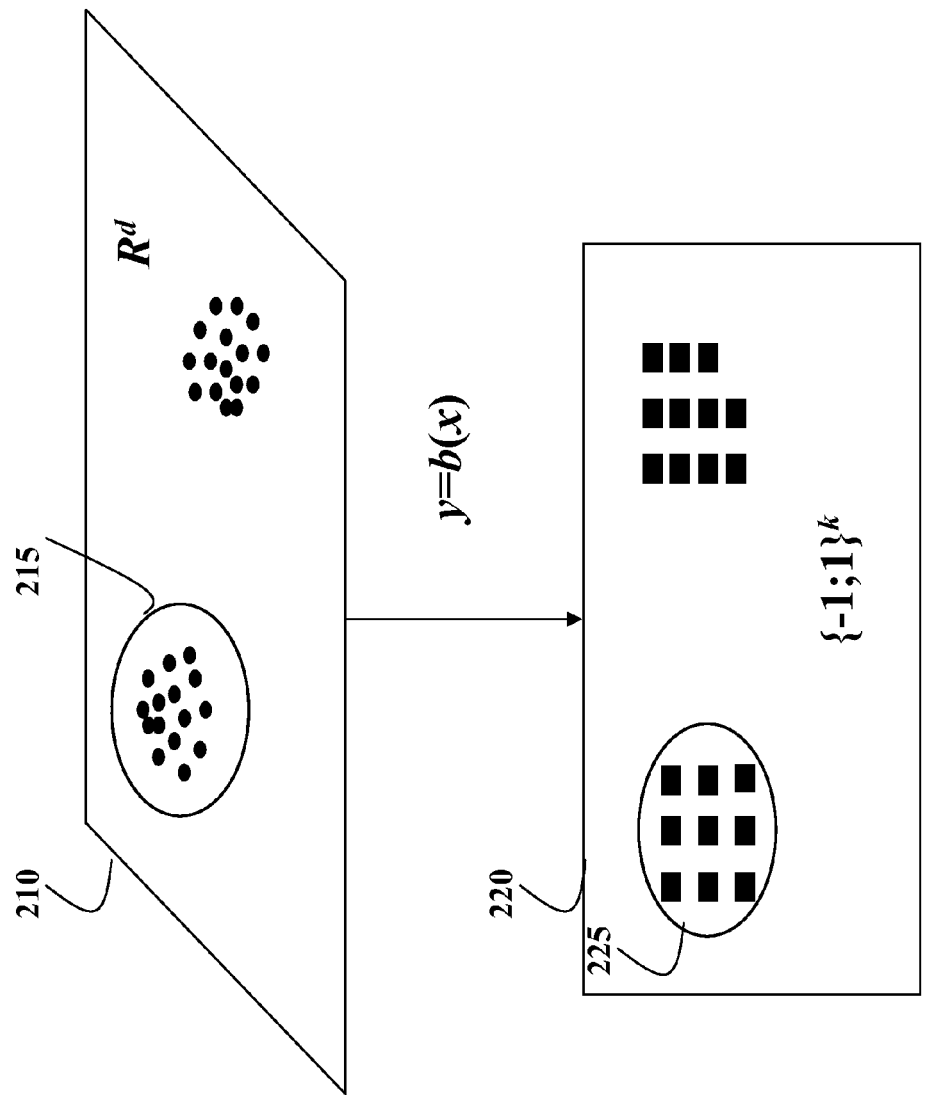
FIG. 2 is a schematic of a prior art spectral hashing method.

FIG. 1 shows a block diagram for a method 100 for determining a nearest neighbor 190 for an input data point 105 lying on the non-Euclidean manifold. Data points 110 lying on non-Euclidean manifold are clustered 120 on the manifold into a set of K clusters 125. The steps of the method can be performed in a processor 101 including memory and input/output interfaces as known in the art.

For each cluster in a set 125, the nearest Euclidean sub-space, e.g., tangent space, is determined 130 to form a set of Euclidean sub-spaces 135, and the data points of each cluster are projected 140 into corresponding nearest Euclidean sub-space, e.g., a nearest Euclidean sub-space 136, producing a set of approximated clusters 145.

Each approximated cluster 145 approximates the data points of each cluster 125 on the corresponding nearest Euclidean sub-space.

Then, each approximated cluster is mapped 150 separately onto a corresponding Hamming space using, e.g., the spectral hashing (SH) method described above, producing a set of Hamming clusters 155, such that neighboring data points on a Hamming cluster from the set 155 correspond to neighboring data points on the non-Euclidean manifold 110.

The method 100 determines 160, which Euclidean sub-space from the set of Euclidean sub-spaces 136 is the nearest to the input data point 105. For example, in one embodiment, the nearest sub-space 136 is selected as the Euclidean sub-space corresponding to a cluster having a center at a minimum geodesic distance from the input data point.

In another embodiment, the closest sub-space is selected as the Euclidean sub-space having a minimal reconstruction error for the input data point.

The input data point is projected on the nearest sub-space and mapped to the Hamming space as described above. A data point 170 corresponding to a data point 165 having a minimal Hamming distance to the input data point in the Hamming space is selected as the nearest neighbor 190 for the input data point on the non-Euclidean manifold.

Since the clustering requires only K distance evaluations, e.g., geodesic distances, or a reconstruction error, a computational cost of the method 100 is O(K) rather than O(N) as in the prior art KSH method described above, where K<<N. Moreover, the clustering of the data points better approximates the uniform distribution assumption in each cluster.

Riemannian Spectral Hashing (RSH)

Figure 3:
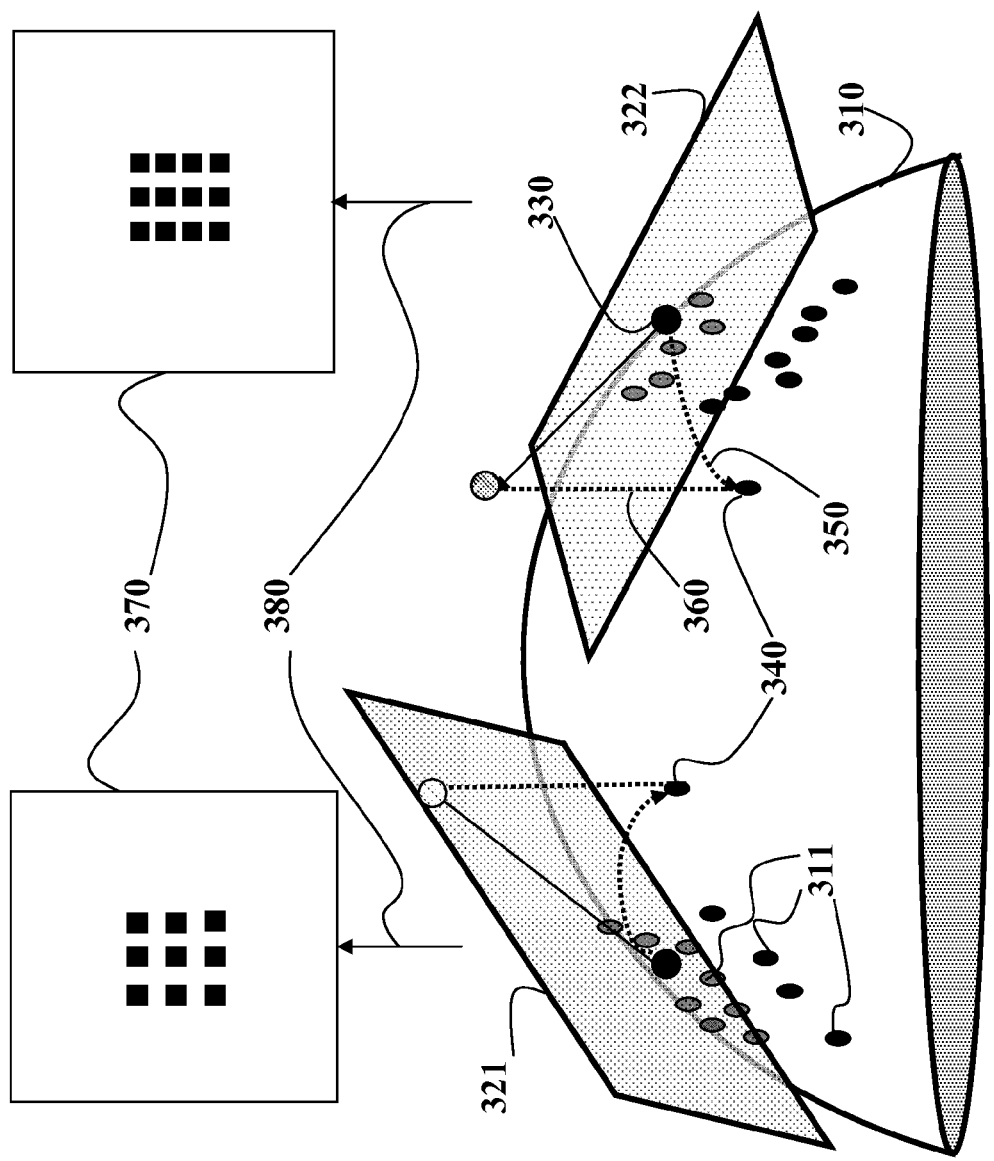
FIG. 3 is schematic of embodiment, wherein the non-Euclidean manifold is Riemannian manifold.

FIG. 3 shows an embodiment, wherein the data points 311 lie on Riemannian manifold 310, and the Euclidean sub-spaces 321-322 are tangent spaces. The tangent space $T_yM$ to a manifold, M at a point y is a Euclidean space. Therefore, the data points $\{x_i\}_{i=1}^{N}$ on the manifold to the tangent space at the data point y, i.e., the point 330, can be projected by using, e.g., a logarithm mapping, $\Delta_i = \overrightarrow{yx_i} = \log_y(x_i)$, and the spectral hashing can be performed on the tangent space projections, $\{\Delta_i\}_{i=1}^{N}$.

Accordingly, one embodiment of the invention clusters the data points into K clusters and selects a center of each cluster as the pole of the corresponding tangent space.

Figure 4:
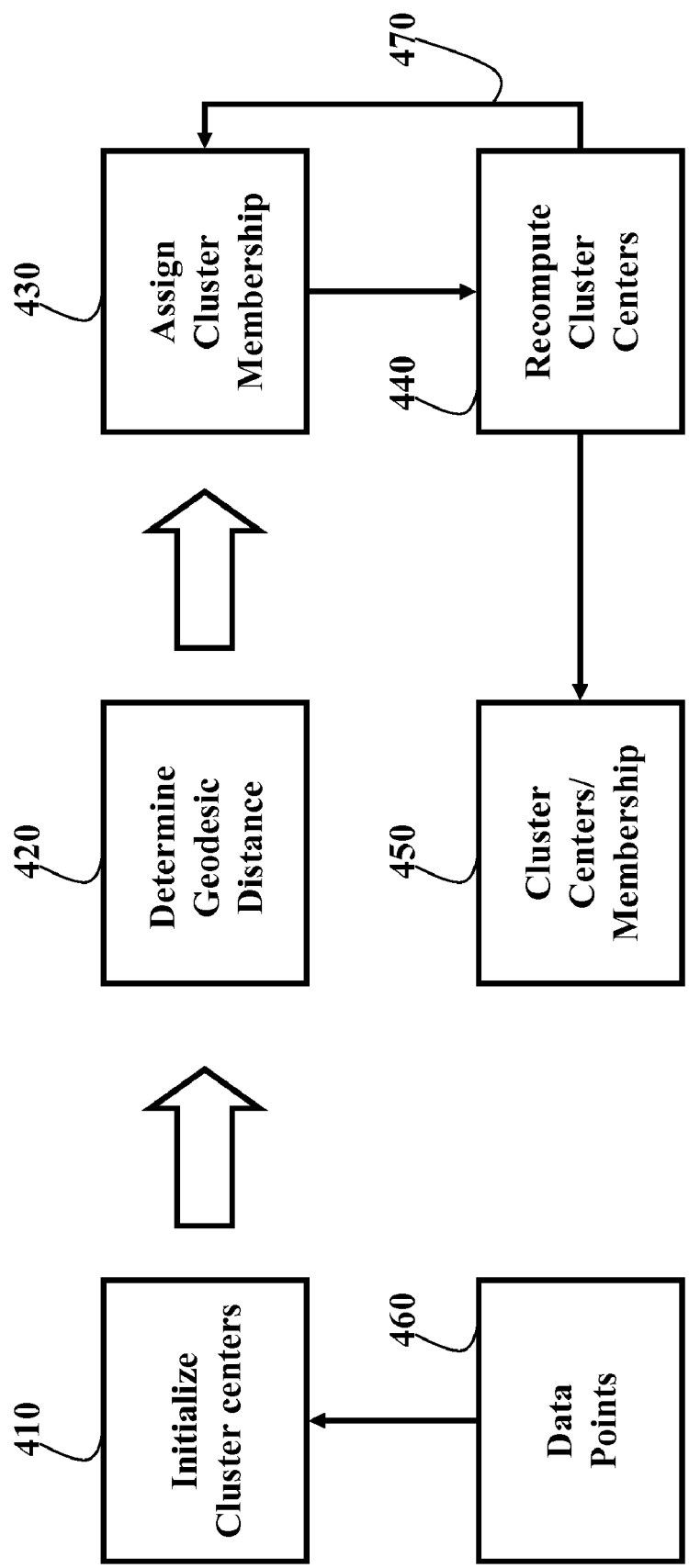
FIG. 4 is a block diagram of Riemannian k-means method for clustering data points according to one embodiment of the invention.

FIG. 4 shows one variation of this embodiment, which uses Riemannian k-means method for clustering the data points according to the following steps:

Initialize 410 cluster centers $\{c_j\}_{j=1}^{K}$ by randomly selecting K points from the data points 460.

For each data point $x_i$, determine 420 geodesic distance to each cluster center according to $$d(c_j, x_i) = \|\log_{c_j}(x_i)\|.$$

Assign 430 the cluster center nearest to the data point as a cluster membership w of the data point according to $$w_i = \mathrm{argmin}_j \|\log_{c_j}(x_i)\|$$

Recompute 440 each cluster center as an extrinsic mean of the data points in each cluster based on the cluster membership according to $$c_j = \mathrm{mean}\{x_i | w_i = j\}$$

Repeat 470 steps 3 and 4 until convergence, which can require repeated uses of the exponential map and the logarithm map on the manifold until convergence to the extrinsic mean.

After the cluster centers and the cluster memberships 450 are determined, all data points in the same cluster are projected to the tangent space around the cluster center using the corresponding logarithm maps. A separate spectral hashing method is then applied 380 on each tangent space to map the approximated clusters to the Hamming space 370.

The input data point z 340 is mapped to the Hamming space by first determining the geodesic distances 350 of the input data point with all the cluster centers and project 360 the input data point to the tangent space of the nearest cluster center $c_k$, wherein k is determined according to $$k = \mathrm{arg}_{min_j} \|\overrightarrow{c_j z}\|.$$

Then, the hashing method, e.g., the spectral hashing described above, is used to map the input data point projected on the tangent space to the Hamming space according to $\Delta_z = \log_{c_k}(z)$.

Distributed Kernel Spectral Hashing (DKSH)

It is not always possible to perform Riemannian k-means method on a manifold. For example, when the logarithm and the exponential maps are not closed-form or are not defined because of the complexity of the manifold, the cluster centers cannot be determined.

Accordingly, one embodiment of the invention uses a non-linear dimensionality reduction method, such as multidimensional scaling (MDS), to project the data points into a low-dimensional Euclidean space and performs k-means method on this low-dimensional space.

In different variation of this embodiment, non-linear clustering methods, such as kernel k-means or spectral clustering, are used to determine cluster associations of the data points. Accordingly, instead of cluster centers, only cluster associations for the data points are determined. After the clustering, one representative data point is selected in each cluster to represent the cluster.

Figure 5:
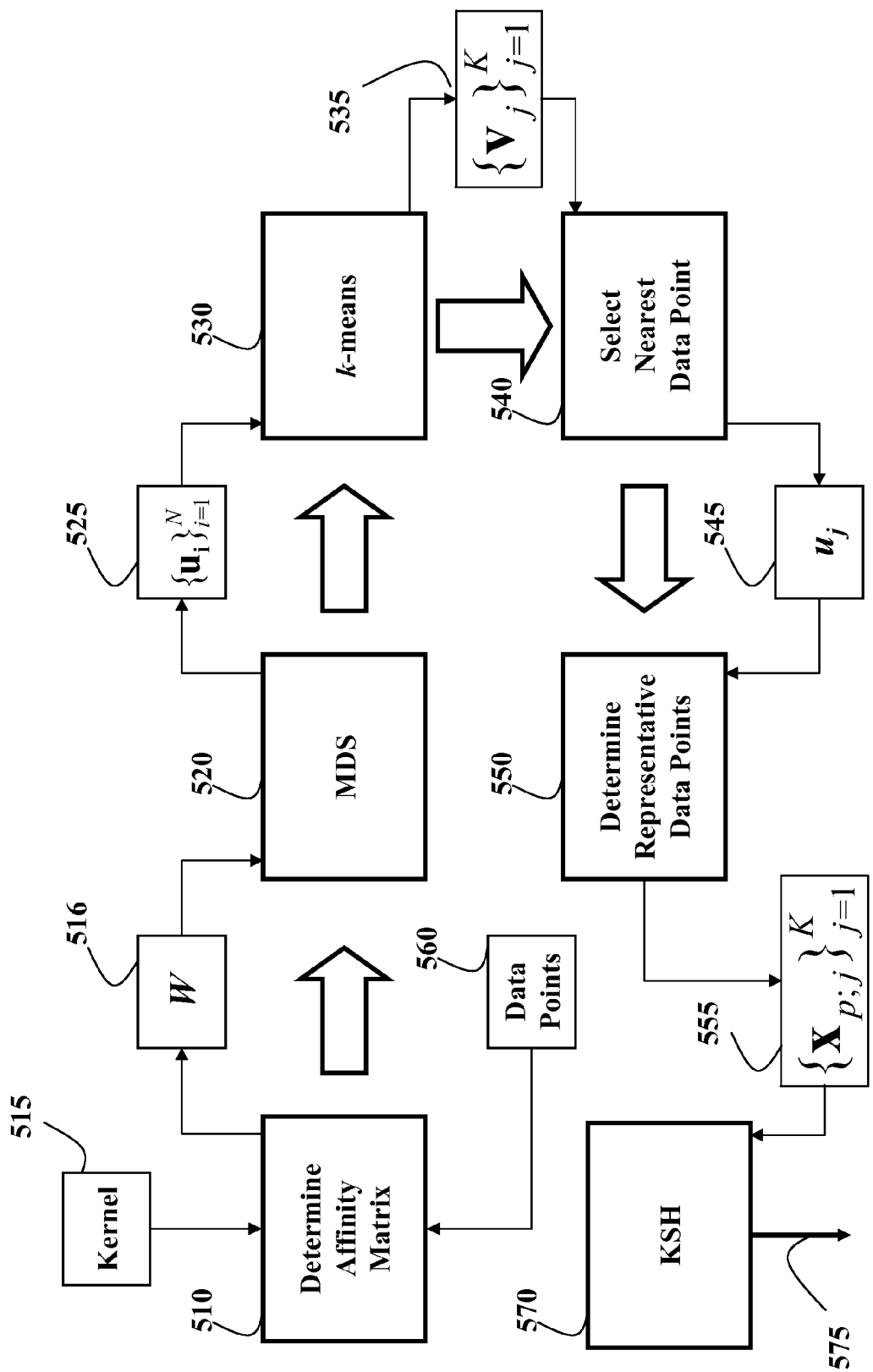
FIG. 5 is a block diagram of a method for determining representative data points of clusters according to another embodiment of the invention.

FIG. 5 shows a method for determining the representative data points of the clusters. The method determines 510 an N×N affinity matrix W 516 of the data points 560 based on a kernel 515, or affinity defined on the manifold. MDS 520 is executed using the affinity matrix to produce a low-dimensional Euclidean representation $\{u_i\}_{i=1}^{N}$ 525 and k-means method 530 is executed on the data points in the low-dimensional space determining K cluster centers $\{v_j\}_{j=1}^{K}$ 535 in the low-dimensional space.

For each cluster center $v_j$, select 540 data point $u_j$ 545 nearest to each cluster center in the low-dimensional space, and determine 550 the representative data points $\{x_{p,j}\}_{j=1}^{K}$ 555 on the manifold corresponding to the mapped data points $\{v_j\}_{j=1}^{K}$ after MDS.

After the representative data point for each cluster has been determined, the kernel spectral hashing (KSH) 570 is separately trained for each cluster to map 575 the data points to the Hamming space.

Similarly to the RSH method, the input data point z is mapped to the Hamming space by determining an affinity $W(x_{p,j}, z)$ of the input data point with each representative data point, selecting a cluster j having highest affinity with the input data point, and using the KSH of that cluster to map the input data point to the Hamming space to retrieve the nearest neighbors.

The overall complexity of the method according this embodiment is approximately O(K+N/K), which is more computationally expensive then the RSH method, but significantly better than the complexity of the KSH method.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for determining a nearest neighbor to an input data point lying on a non-Euclidean manifold from data points lying on the non-Euclidean manifold, comprising the steps of:
   clustering the data points into a set of clusters;
   determining, for each cluster, a Euclidean sub-space nearest to the cluster to form a set of Euclidean sub-spaces;
   projecting the data points of each cluster into the Euclidean sub-space nearest to the cluster, such that each cluster is approximated by data points lying on the Euclidean sub-space to produce a set of approximated clusters;

mapping each of the approximated clusters into a corresponding Hamming space to produce a set of Hamming clusters, such that neighboring data points of the Hamming cluster corresponds to neighboring data points on the non-Euclidean manifold;

mapping the input data point to the Hamming cluster corresponding to a particular Euclidean sub-space, wherein the particular Euclidean sub-space is nearest to the input data point; and selecting the data point corresponding to the nearest data point to the input data point in the Hamming space as the nearest neighbor for the input data point on the non-Euclidean manifold, wherein the steps are performed in a processor.

2. The method of claim 1, wherein the Euclidean sub-space nearest to the cluster is a tangent space.

3. The method of claim 1, further comprising:
mapping the approximated cluster to the corresponding Hamming space using a spectral hashing method.

4. The method of claim 1, further comprising:
determining geodesic distances between the input data point and centers of each cluster; and
selecting the particular Euclidean sub-space as the Euclidean sub-space corresponding to the cluster having a center at a minimum geodesic distance from the input data point.

5. The method of claim 1, further comprising:
selecting the particular Euclidean sub-space as the Euclidean sub-space having a minimal reconstruction error for the input data point.

6. The method of claim 1, wherein the data points lie on a Riemannian manifold, and the set of Euclidean sub-spaces is a set of tangent spaces.

7. The method of claim 1, wherein the clustering further comprises:
clustering the data points based on a Riemannian k-means method.

8. The method of claim 1, wherein the clustering further comprises:
initializing cluster centers by randomly selecting K points from the data points;
determining, for each data point, a geodesic distance to each cluster center;
assigning the cluster center nearest to the data point as a cluster membership of the data point;
recomputing each cluster center as an extrinsic mean of the data points in each cluster based on the cluster membership; and
repeating the assigning and recomputing until convergence to the extrinsic mean.

9. The method of claim 1, further comprising:
projecting the data points into a low-dimensional Euclidean space using a non-linear dimensionality reduction; and
determining a cluster association of the data points on the low-dimensional Euclidean space.

10. The method of claim 9, further comprising:
performing the non-linear dimensionality reduction based on multidimensional scaling.

11. The method of claim 9, further comprising:
performing a non-linear clustering for the determining the cluster association based on kernel k-means and/or spectral clustering.

12. The method of claim 9, further comprising:
selecting a representative data point in each cluster to represent the cluster.

13. The method of claim 9, wherein the selecting further comprises:
determining a mapped data point nearest to a center of the cluster in the low-dimensional Euclidean space; and
selecting the representative data point on the manifold corresponding to the mapped data point.

14. The method of claim 12, further comprising:
mapping the data points of each cluster to the Hamming space based on kernel spectral hashing (KSH).

15. A method for determining a nearest neighbor to an input data point lying on a non-Euclidean manifold from data points lying on the non-Euclidean manifold, wherein the data points are clustered and the data points of each cluster are projected into Euclidean sub-space nearest to the cluster and mapped from the Euclidean sub-space into a Hamming space producing a set of Hamming spaces such that neighboring data points of the Hamming space corresponds to neighboring data points on the non-Euclidean manifold, comprising steps of:
mapping the input data point to the Hamming space corresponding to a particular Euclidean sub-space, wherein the particular Euclidean sub-space is the nearest to the input data point, wherein the mapping is performed by a processor; and
selecting a data point corresponding to a nearest data point to the input data point in the Hamming space as the nearest neighbor for the input data point on the non-Euclidean manifold.

16. The method of claim 15, further comprising:
determining geodesic distances between the input data point and centers of each cluster; and
selecting the particular Euclidean sub-space as the Euclidean sub-space corresponding to a cluster having a center at a minimum geodesic distance from the input data point.

17. The method of claim 15, further comprising:
selecting the particular Euclidean sub-space as the Euclidean sub-space having a minimal reconstruction error for the input data point.

18. A system for determining a nearest neighbor to an input data point lying on a non-Euclidean manifold from data points lying on the non-Euclidean manifold, wherein the data points are clustered and the data points of each cluster are projected into Euclidean sub-space nearest to the cluster and mapped from the Euclidean sub-space into a Hamming space producing a set of Hamming spaces such that neighboring data points of the Hamming space corresponds to neighboring data points on the non-Euclidean manifold, comprising:
a processor configured to map the input data point to the Hamming space corresponding to a particular Euclidean sub-space, wherein the particular Euclidean sub-space is the nearest to the input data point, wherein the mapping is performed by a processor; and
means for selecting a data point corresponding to a nearest data point to the input data point in the Hamming space as the nearest neighbor for the input data point on the non-Euclidean manifold.

19. The system of claim 18, further comprising:
means for determining geodesic distances between the input data point and centers of each cluster; and
means for selecting the particular Euclidean sub-space as the Euclidean sub-space corresponding to a cluster having a center at a minimum geodesic distance from the input data point.

20. The system of claim 18, further comprising:
means for selecting the particular Euclidean sub-space as the Euclidean sub-space having a minimal reconstruction error for the input data point.

* * * * *